March 13, 1962     G. R. FORSNESS, JR     3,025,383
PRESSURE CONTACT ASSEMBLY FOR ELECTRIC APPLIANCES
Filed Jan. 23, 1961     2 Sheets-Sheet 1

INVENTOR.
GILMAN R FORSNESS, JR
BY
ATTORNEY

March 13, 1962 G. R. FORSNESS, JR 3,025,383
PRESSURE CONTACT ASSEMBLY FOR ELECTRIC APPLIANCES
Filed Jan. 23, 1961 2 Sheets-Sheet 2

INVENTOR.
GILMAN R. FORSNESS, JR.
BY
F. R. Geisler
ATTORNEY

United States Patent Office 3,025,383
Patented Mar. 13, 1962

3,025,383
PRESSURE CONTACT ASSEMBLY FOR ELECTRIC APPLIANCES
Gilman R. Forsness, Jr., 1025 2nd Ave. SW., Great Falls, Mont.
Filed Jan. 23, 1961, Ser. No. 84,206
9 Claims. (Cl. 219—43)

This invention relates to electric heating appliances constructed in such manner as to become operative when so placed as to exert pressure contact against a pair of separated contact elements connected to a suitable source of electric current. More specifically, this invention relates to an assembly for use with electrically-heated vessels, such as cooking utensils in which the electric heating elements are embodied in the vessels themselves, with such heating elements provided with external means through the medium of which the heating elements become activated whenever the vessels are placed in contact with terminal electrodes in a suitable electrical current circuit.

In particular the present invention relates to an electric contact assembly designed for vessels and cooking utensils containing such electric heating elements in which assembly the heating elements of the vessels will become actively connected with terminal electrodes in an electric current circuit merely by pressure contact with such electrodes, as distinguished from combinations in which similar vessels are connected with the current source only by being plugged into an electric outlet socket. In this invention the necessary pressure contact is provided entirely by the weight of the vessel when it is placed in proper position with respect to the terminal electrodes of the assembly providing the current-supplying circuit.

An object of this invention is to provide an improved electric heating and cooking assembly for vessels or cooking utensils having built-in heating elements, which will be simple, practical and convenient to use, as well as being foolproof.

Another object of the invention is to provide a pressure contact assembly for such electric appliances which will be suitable for installation in a counter or table top.

A further object of the invention is to provide a pressure contact assembly having terminal electrodes adapted for mounting in a counter or table top with the terminal electrodes so arranged that they will become electrically connected in the electric current circuit only when properly contacted by a suitable vessel or cooking utensil, and which will not become active or electrically connected with such current circuit when inadvertently contacted by other objects on the counter or table top.

A more specific object of the invention is to provide a practical pressure contact assembly for electric cooking utensils which will have a pair of spaced terminal electrodes located in the top cooking surface, capable of being pressed downwardly below such cooking surface, but which will become activated only when both terminal electrodes are pressed downwardly and only while maintained in such downwardly-pressed position.

A still further object of the invention is to provide additional control means whereby such terminal electrodes can be rendered entirely inactive even though both have been pressed down into activating position.

An additional object of the invention is to provide a practical pressure contact assembly of the type above mentioned, suitable for installation in a counter or table top, equipped with a pair of terminal contact elements or electrodes which can be kept clean with only a minimum amount of care and which will not be injured or rendered ineffective with the spilling of liquids on or around such electrodes.

A still further object of the invention is to provide a safe and practical contact assembly for electric cooking utensils which will be relatively inexpensive to manufacture and which can be easily and quickly installed in any suitable cooking surface, counter or table top at any convenient location accessible to a source of electric current, and thus adapted to meet a popular demand for improved and simplified electric cooking means.

The manner in which these objects and incidental advantages are achieved, and the construction and operation of the contact assembly of the present invention, will be readily understood from the following brief description with reference to the accompanying drawings.

In the drawings:

FIG. 3 is a wiring diagram of the entire assembly.

Figure 1:
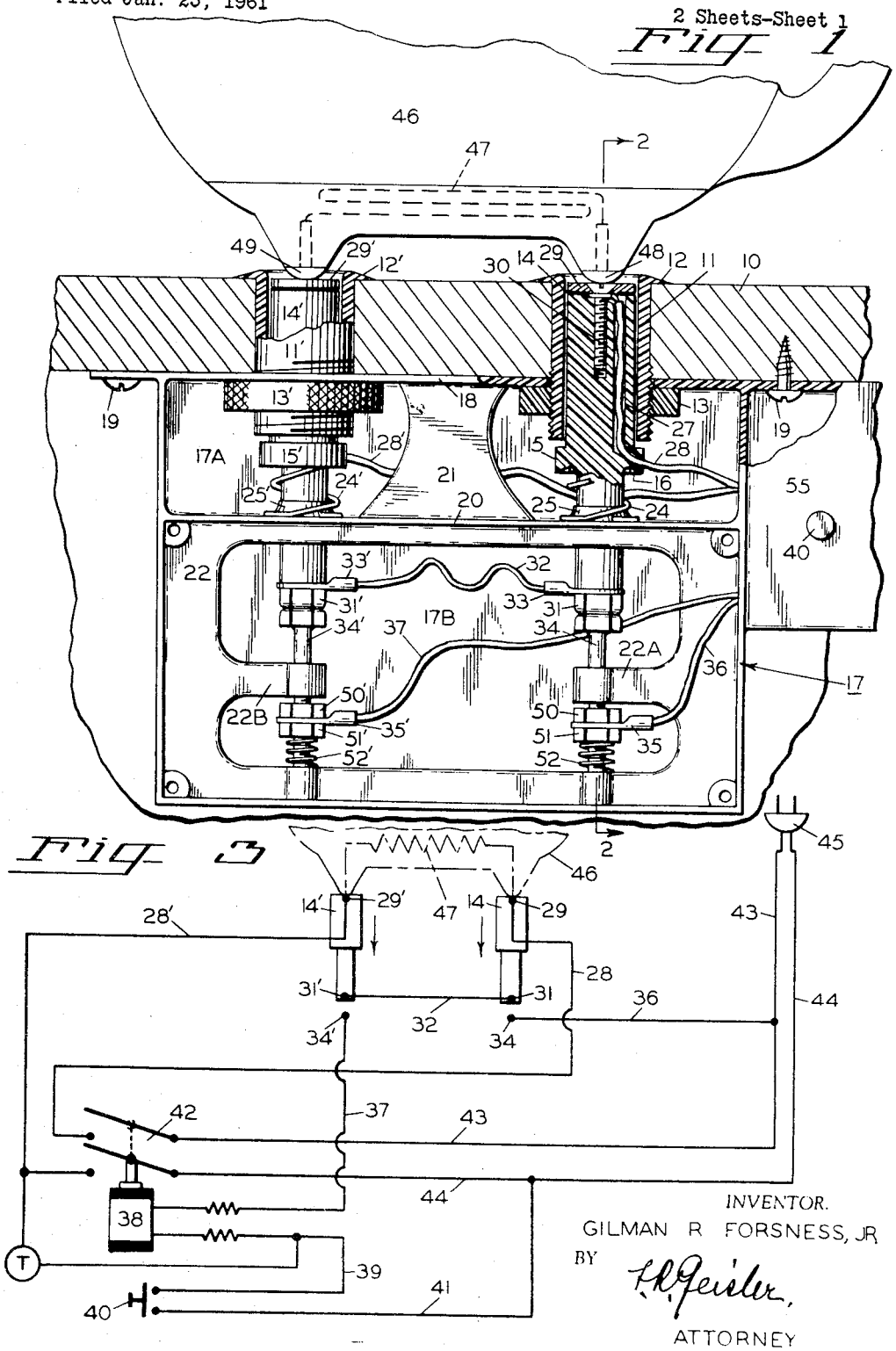
FIG. 1 is a front elevation of the assembly, the front cover plate being removed from the lower part of the assembly housing, with parts of some members in the assembly broken away and shown in section for clarity, and with the portion of the range top or counter to which the device is secured shown in section.

Referring first to FIG. 1, the reference character 10 indicates a counter, table top, or other suitable support providing a desired horizontal cooking surface. As previously indicated, the assembly is intended for use with cooking utensils and the like which have built-in electric heating elements and which heating elements become active when the two terminals are connected with a source of electric current. In FIG. 1 the lower portion of a cooking utensil 46 is shown, in the base of which an electric heating element is contained, indicated by the broken lines 47, the terminals for the heating element extending down through a pair of legs on the cooking utensil and terminating in outer contact conductor elements 48 and 49 respectively. The pressure contact assembly, to be presently described, is so arranged that, when the cooking utensil is set in the position illustrated in FIG. 1, the contact elements 48 and 49 will, under certain conditions, be automatically connected to a source of electric current and thus result in the heating of the cooking utensil. Cooking utensils having electric heating elements built into the base or body of the utensil are well known and consequently the utensil 46, shown in part in FIG. 1 by way of illustration, need not be further described.

The counter 10 is provided with a pair of apertures to accommodate a pair of identical sleeves 11, 11' (FIG. 1) which extend through the apertures and down through corresponding apertures in the top wall 18 of a housing 17, which housing is adapted to be secured beneath the counter 10. The sleeves 11, 11' are made of non-conducting or insulating material, preferably plastic, and pass down into the top portion of the housing 17 substantially as shown. The top ends of the sleeves 11, 11' preferably are formed without outwardly-extending peripheral flanges 12, 12', the top surfaces of which preferably slope obliquely downwardly to meet the surrounding top surface of the counter 10. The lower ends of the sleeves 11, 11' are externally threaded to receive clamping nuts 13, 13' respectively, also preferably made of plastic, by which the sleeves 11, 11' are firmly held in place in the counter.

Tthe housing 17 (FIGS. 1 and 2) as shown is substantially rectangular. It is suspended from the under side of the counter 10 by having the top wall 18 of the housing secured to the under side of the counter through any suitable means, such as the screws 19 (FIG. 1). The housing 17 is divided into upper and lower compartments 17A and 17B by a horizontal partitioning wall 20. The housing 17 is reinforced in the upper portion by a vertical central brace 21 extending between the wall 20 and the top wall 18, and this brace becomes a continuous reinforcing web 22 below the wall 20 extending around on the inside of the lower compartment 17B and centrally positioned. The upper compartment 17A has an integral rear wall 26, and the lower compartment 17B has a removable rear cover plate 23 and a similar removable front cover plate (not shown), the drawings showing the front cover plate removed. The housing 17 also has an additional compartment located on one side, which is shown in part at 55 in FIG. 1.

Figure 2:
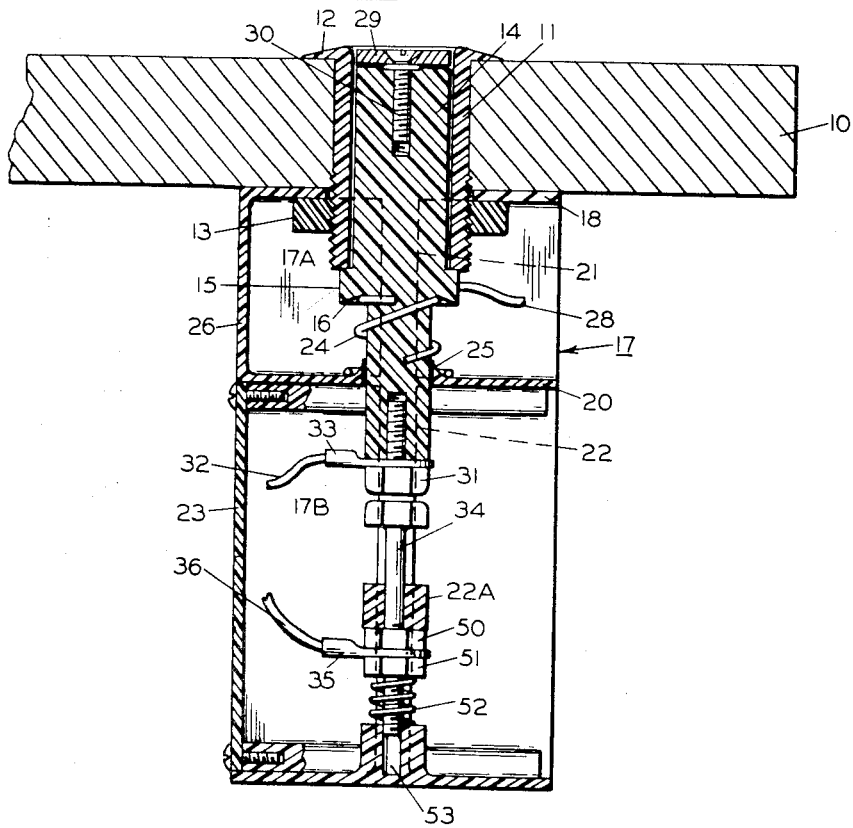
FIG. 2 is a sectional elevation taken on line 2—2 of FIG. 1, drawn to a slightly larger scale.

A pair of spring-mounted electrode carriers 14, 14' are slidably supported in the sleeves 11, 11' respectively. These electrode carriers also are formed of insulating material, preferably plastic, and are shaped preferably as shown in FIGS. 1 and 2. Thus their upper portions have a diameter slightly less than the inside diameter of the sleeves 11, 11' and the lower portions are preferably of smaller diameter. An integral collar 15, 15' separates the upper from the lower portions of these carriers and the collars are so located that the collars will contact the bottom ends of the sleeves 11, 11' respectively when the carriers are in the maximum raised or normal position illustrated by the carrier 14 in FIG. 2. Coil springs 24, 24', held under compression between the horizontal partitioning wall 20 and the collars 15, 15' respectively, normally hold the carriers in the maximum raised position indicated in FIG. 2, but enable the carriers to be pushed downwardly against the force of the springs by the weight of a cooking utensil, such as the utensil 46 in FIG. 1, provided the cooking utensil is equipped with downwardly-extending legs so spaced as to be supported on the two carriers simultaneously. The lower portions of the two electrode carriers 14, 14' extend through apertures in the horizontal wall 20 and into the lower compartment 17B and are slidable in flanged sleeves 25, 25' mounted on the horizontal wall 20. An important purpose of these flanged sleeves 25, 25' is to prevent any liquids, which might drop down inside the sleeves 11, 11' from the top surface of the counter 10, from passing down into the lower compartment 17B. The collars 15, 15' also cooperate in this regard since any liquid which passes down within either of the sleeves 11, 11' would have to move out to the periphery of the respective collar before dropping down onto the horizontal wall 20, with the result that such liquid would reach the wall 20 beyond the flanged sleeves 25, 25'. The under sides of the collars 15, 15' are also preferably undercut, as shown at 16 in FIGS. 1 and 2, to provide drip lips and prevent any liquid when reaching a collar from turning inwardly and continuing down the surface of the lower reduced diameter portion of the carrier 14 or 14'. While the possibility of any liquid passing down through the sleeves 11, 11' would occur only in the event liquid is either spilled into the sleeves from the top or else spilled on the counter surrounding the sleeves in such manner as to pass over the top ends and down into the sleeves, nevertheless, since the spilling of liquid inadvertently does occur from time to time on all cooking surfaces, and since the penetration of any liquid into the lower compartment 17B could, over an extended period, impair the electrical contact elements which are located in the lower part of the housing 17 as presently explained, the keeping of the lower compartment protected from any liquid spilled on the counter is one of the important features of the device. The top flanges 12, 12' on the sleeves 11, 11' are an aid in this purpose since the flanges will keep small amounts of liquid which are spilled on the counter around the sleeves from passing into the sleeves. At the same time the sloping top surfaces of these flanges make them less likely to act as obstacles on the cooking surface and furthermore do not interfere with the easy cleaning of the top counter surface.

Electric contact discs or copper electrodes 29, 29' are mounted on the top ends of the electrode carriers 14, 14' respectively and are secured in place on the carriers by suitable screws 30. Conductor wires 28, 28' pass upwardly through the upper portions of the carriers 14, 14' respectively and have their terminal ends clamped in contact with the electrodes 29, 29' by the screws 30. The conductor wires 28, 28' pass through suitable channels provided in these upper portions of the carriers, one of these channels being shown at 27 in FIG. 1. The conductor wires 28, 28' extend from the upper compartment 17A into the side compartment 55 where they are connected to switch terminals, as later explained.

Contact conductor elements 31, 31' are secured on the bottom ends of the carriers 14, 14' respectively, having threaded shanks which screw into threaded recesses in the ends of the carriers, as illustrated in FIG. 2, or such contact elements may be secured on the bottom ends of the carriers in any other suitable manner. These contact elements are so arranged as to close contact with the heads of cooperating contact elements 34, 34' which are positioned below the carriers 14, 14' respectively, in axial alignment with them, and which are slidably mounted in vertical channels extending through bracket arms 22A, 22B formed integral with the reinforcing web 22, and in bottom channels, one of which is shown at 53 in FIG. 2. Pairs of clamping nuts 50, 51 and 50', 51' are adjustably carried on the contact elements 34, 34' respectively, the lower portions of the contact elements being threaded to receive the nuts, and coil springs 52, 52' are carried on these contact elements and held under compression between the lower nuts 51, 51' and the top edge of the lower portion of the reinforcing web 22. Thus the upper clamping nuts 50, 50' determine the extent to which the springs 52, 52' can raise the contact elements 34, 34' when the tops of these elements are not engaged by the upper contact elements 31, 31'.

The upper contact elements 31, 31' are connected to each other by a conductor wire 32 which is provided with terminal members 33, 33' which are clamped against the contact elements 31, 31' respectively. The lower contact element 34 is electrically connected with a conductor wire 36 through a terminal member 35 and the lower contact element 34' similarly is connected with a conductor wire 37 through a terminal member 35'. The conductor wires 36 and 37 extend from the lower compartment 17B into the side compartment 55 and the closing of the contacts 31, 34 and 31', 34' energizes a solenoid circuit which causes operation of control switch means in the circuit to the electrodes 29, 29' in the manner to be described with reference to the wiring diagram in FIG. 3.

In FIG. 3 the two conductor wires 28, 28', connected to the electrodes 29, 29' at the top ends of the spring-mounted electrode carriers 14, 14' respectively, are shown arranged for being connected to main conductor wires 43 and 44 respectively through the intermediary of a switch assembly 42, which switch assembly is closed by the operation of the solenoid 38 whenever the solenoid is energized. Energizing of the solenoid 38 is brought about by downward movement of both electrode carriers 14, 14' sufficiently to close the contacts 31, 34 and 31', 34' and by manually closing the switch 40 for a moment. The manual switch 40 acts as a momentary "on" switch. The circuit to the solenoid 38 is thus completed from the main conductor 43, through conductor 36, contacts 34, 31, conductor 32, contacts 31', 34', conductor 37, conductor 39, closed switch 40, and conductor 41 to the main conductor 44 and the energizing of the solenoid 38 closes the switch assembly 42. Since energizing of the solenoid 38 requires very little current, the solenoid is connected with the conductors 37 and 39 through the medium of suitable resistors. It is assumed that the main conductors 43 and 44 are connected to a suitable power source, thus, for example to the house wiring current, which could be by means of a plug indicated at 45. A timing switch T connects the conductors 28' and 39 and thus forms a timed holding circuit for the solenoid 38 when the momentary "on" switch 40 is released. The timing switch T may be of any suitable type capable of remaining closed for a predetermined length of time and thereupon opening automatically. Such switches are well known and it is not necessary to describe such a switch here.

Thus, from FIG. 3 it will be apparent that, in order for the electrodes 29, 29' to become operative and pass the desired current through the element 47 in the cooking utensil 46, it is necessary not only that the manual switch 40 be momentarily turned on but also that both electrode carriers 14, 14' be pushed down sufficiently to close the contacts 31, 34 and 31', 34'. Inadvertent pushing down of one electrode carrier, even with the switch 40 turned on, will not cause either electrode to become connected to the source of current, and pushing down both electrodes simultaneously will be equally ineffective unless the switch 40 is turned on.

With this pressure contact assembly the two contact electrodes 29, 29' are cold at all times, the heat being confined to the heating element in the vessel or cooking utensil. Thus no serious cleaning problem ever arises since food or other materials spilled on the cold electrodes is easily wiped off or washed off inasmuch as no burning takes place. The likelihood of any spilled material passing down into the housing 17 is reduced to a minimum, and even when this occurs such spilled material cannot reach the contact elements in the lower compartment 17B of the housing or reach the switch elements in the side compartment 50.

The clamping nuts 50, 51 and 50', 51' are so adjusted on the lower contact elements 34, 34' that there will be only a slight spacing between the upper contact elements 31, 31' and the lower contact elements 34, 34' when the electrode carriers 14, 14' are in the inactive raised position shown in FIG. 2. The lowering of these electrode carriers under the weight of a cooking utensil, as shown in FIG. 1, will also cause the lower contact elements 34, 34' to be pushed down against the force of their springs 52, 52'. This is an important feature since the vibration set up in the cooking utensil by the boiling of water for example, and, carried down by the electrode carriers 14, 14' might cause fluctuation in the contacts between the upper and lower contact elements if the latter were stationary.

Since the contact electrodes 29, 29' remain disconnected at all times except when both electrodes carriers 14, 14' are pushed down below the level of the cooking surface, with the switch 40 turned on, and since the upper ends of the insulating sleeves 11, 11' together with their flanges 12, 12', act as a further guard against any such inadvertent contact with the electrode carriers as to cause downward pressure on both carriers to be exerted simultaneously, the danger which might result from articles having inadvertent contact with the electrodes is practically eliminated.

The entire assembly, when fabricated as described, can be produced at reasonable cost and is suitable for installation on any counter or similar cooking or working surface where access to adequate electric current is available. Various modifications would be possible in the different parts of the assembly without departing from the principle or scope of the invention, and it is not intended to restrict the invention eactly to the construction shown, which is shown only as a preferred example, or to limit the invention otherwise than as set forth in the claims.

I claim:

1. In a pressure contact assembly for electric appliances, a support having a top working surface, a pair of spaced, slidably-mounted non-conducting electrode carriers extending downwwardly from said support, an electrode mounted on the top of each of said electrode carriers, a pair of conductors and an interposed main switch assembly connecting said electrodes to a source of electric current, means limiting the upward movement of said carriers and therewith of said electrodes, means exerting a force to maintain the carriers in maximum raised position but enabling the carriers to be thrust downwardly against the force of said latter mentioned means, a contact element connected with the lower portion of each carrier, said contact elements electrically connected to each other, a pair of lower cooperating contact elements so arranged as to be contacted by said first mentioned contact elements respectively when said carriers are thrust downwardly against the force of said latter mentioned means, electrically actuated means for operating said main switch assembly, a circuit for said electrically actuated means, said first mentioned contact elements, said cooperating contact elements and a control switch included in said last mentioned circuit, whereby said electrically actuated means will operate said main switch assembly and cause said electrodes to be actively connected with said source of electric current only upon the closing of said control switch and the thrusting of both of said carriers downwardly sufficiently to bring said first mentioned contact elements against said cooperating contact elements.

2. In a pressure contact assembly for electric appliances, a support, a top working surface on said support, a housing located beneath said support, a pair of identical, spaced, slidably-mounted non-conducting electrode carriers extending downwardly into said housing from said support, an electrode mounted on the top of each of said electrode carriers, a pair of conductors and an interposed main switch assembly connecting said electrodes to a source of electric current, means on said carriers limiting the upward movement of said carriers and therewith of said electrodes, means on each carrier exerting a force to maintain the carrier in maximum raised position but enabling the carrier to be thrust downwardly against the force of said latter mentioned means, a contact element connected with the lower portion of each carrier, said contact elements electrically connected to each other, a pair of lower cooperating contact elements mounted in the bottom of said housing and so arranged as to be contacted by said first mentioned contact elements respectively when said carriers are thrust downwardly against the force of said latter mentioned means, a solenoid operating said main switch assembly, a circuit for said solenoid, said first mentioned contact elements, said cooperating contact elements and a control switch included in said last mentioned circuit, whereby said solenoid will operate said main switch assembly and cause said electrodes to be actively connected with said source of electric current only upon the closing of said control switch and the thrusting of both of said carriers downwardly sufficiently to bring said first mentioned contact elements against said cooperating contact elements.

3. In a pressure contact assembly for electric appliances, a support, a top working surface on said support, a housing located beneath said support and suspended therefrom, a pair of spaced, spring-mounted non-conducting electrode carriers extending downwardly into said housing from said support, a pair of sleeves of non-conducting material, said sleeves extending downwardly from said top working surface on said support, means for securing said sleeves in place on said support, the upper portions of said electrode carriers slidable in said sleeves respectively, an electrode mounted on the top of each of said electrode carriers within said sleeves respectively, a pair of conductors and an interposed main switch assembly connecting said electrodes to a source of electric current, a shoulder on each carrier engaging the lower end of the sleeve when the carrier is in maximum raised position, spring means on each carrier exerting a force to maintain the carrier in raised position but enabling the carrier to be thrust downwardly against the force of said spring means, a contact element on the bottom of each carrier, said contact elements electrically connected to each other, a pair of spring mounted cooperating contact elements mounted in the bottom of said housing and so arranged as to be contacted by said first mentioned contact elements respectively when said carriers are thrust downwardly against the force of said spring means, a solenoid operating said main switch assembly, a circuit for said solenoid, said first mentioned contact elements, said cooperating contact elements and a control switch included in said last mentioned circuit, whereby said solenoid will operate said main switch assembly and cause said electrodes to be actively connected with said source of electric current only upon the closing of said control switch and the thrusting of both of said carriers downwardly sufficiently to bring said first mentioned contact elements against the cooperating contact elements.

4. The combination set forth in claim 3 with said housing having a horizontal partition dividing said housing into upper and lower compartments, with said electrode carriers extending down through said horizontal partition, and with means on said horizontal partition surrounding said carriers to prevent any liquid from passing down on said carriers into said lower compartment.

5. In a device of the character described, a support having a top working surface, a housing located beneath said support, means for securing said housing on the underside of said support, a horizontal partition in said housing dividing said housing into upper and lower compartments, a pair of electrode carriers extending downwardly into said housing from said support, said carriers formed of non-conducting material, a pair of sleeves of non-conducting material, said sleeves extending downwardly from said top working surface on said support, means for securing said sleeves in place on said support, the upper portions of said electrode carriers slidable in said sleeves respectively, an electrode mounted on the top of each of said electrode carriers within said sleeves respectively, a pair of conductors and an interposed main switch assembly connecting said electrodes to a source of electric current, means on said carriers limiting the upward movement of said carriers and therewith of said electrodes, spring means on each carrier exerting a force to maintain the carrier in raised position but enabling the carrier to be thrust downwardly against the force of said spring means, a contact element on the bottom of each carrier, said contact elements electrically connected to each other, a pair of lower adjustable cooperating contact elements mounted in the bottom of said housing and so arranged as to be contacted by said first mentioned contact elements respectively when said carriers are thrust downwardly against the force of said spring means, a solenoid operating said main switch assembly, a circuit for said solenoid, said first mentioned contact elements, said cooperating contact elements and a control switch included in said last mentioned circuit, whereby said solenoid will operate said main switch assembly and cause said electrodes to be actively connected with said source of electric current only upon the closing of said control switch and the thrusting of both of said carriers downwardly sufficiently to bring said first mentioned contacting elements against said cooperating contact elements.

6. The combination set forth in claim 5 with said electrode carriers having lower portions of reduced diameter, said lower portions extending down through said horizontal partition and means on said horizontal partition surrounding said carriers to prevent any liquid from passing down on said carriers into said lower compartment, and with the means for limiting the upward movement of said carriers consisting of a collar on each carrier engaging the lower end of the respective sleeve when the carrier is in maximum raised position.

7. A pressure contact assembly for electric appliances including a counter, a top working surface on said counter, a housing located beneath said counter and suspended therefrom, a horizontal partition in said housing dividing said housing into upper and lower compartments, a pair of spaced, slidably mounted non-conducting electrode carriers extending downwardly into said housing from said counter, a pair of sleeves of non-conducting material, said counter provided with apertures for said sleeves, said sleeves extending downwardly from said top working surface on said counter, means for securing said sleeves in place on said counter, the upper portions of said electrode carriers slidable in said sleeves respectively, peripheral top flanges on said sleeves located on said working surface of said counter, an electrode mounted on the top of each of said electrode carriers within said sleeves respectively, a pair of conductors and an interposed main switch assembly connecting said electrodes to a source of electric current, said electrode carriers having lower portions of reduced diameter, said lower portions extending down through said horizontal partition, means on said carriers limiting the upward movement of said carriers and therewith of said electrodes, spring means on each carrier exerting a force to maintain the carriers in raised position but enabling the carrier to be thrust downwardly against the force of said spring means, a contact element on the bottom of each carrier, said contact elements electrically connected to each other, a pair of lower cooperating contact elements so arranged as to be contacted by said first mentioned elements respectively when said carriers are thrust downwardly against the force of said spring means, electrically actuated means for operating said main switch assembly, a circuit for said electrically actuated means, said first mentioned contact elements, said cooperating contact elements and a control switch included in said last mentioned circuit, whereby said electrically actuated means actively connected with said source of electric current only upon the closing of said control switch and the thrusting of both of said carriers downwardly sufficiently to bring said first mentioned contact elements against said cooperating contact elements.

8. In a pressure contact assembly for electric appliances including a support counter having a top working surface, a housing located beneath said counter, means for securing said housing on the underside of said counter, a horizontal partition in said housing dividing said housing into upper and lower compartments, a pair of identical, spaced, slidably-mounted electrode carriers extending downwardly into said housing from said counter, said carriers formed of non-conducting material, pair of sleeves of non-conducting material, said counter provided with apertures for said sleeves, means for securing said sleeves in place on said counter, the upper portions of said electrode carriers slidable in said sleeves respectively, an electrode mounted on the top of each of said electrode carriers within said sleeves respectively, a pair of conductors and an interposed main switch assembly connecting said electrodes to a source of electric current, said electrode carriers having lower portions of reduced diameter, said lower portions extending down through said horizontal partition, means on said horizontal partition surrounding said carriers to prevent any liquid from passing down on said carriers into said lower compartment, a collar on each carrier engaging the lower end of the sleeve when the carrier is in maximum raised position, spring means on each carrier exerting a force to maintain the carrier in maximum raised position but enabling the carrier to be thrust downwardly against the force of said spring means, a contact element on the bottom of each carrier, said contact elements electrically connected to each other, a pair of lower cooperating contact elements adjustably mounted in the bottom of said housing and so arranged as to be contacted by said first mentioned contact elements respectively when said carriers are thrust downwardly against the force of said spring means, a solenoid operating said main switch assembly, a circuit for said solenoid, said first mentioned contact elements, said cooperating contact elements and a manually operable control switch included in said last mentioned circuit, whereby said solenoid will operate said main switch assembly and cause said electrodes to be actively connected with said source of electric current only upon the closing of said control switch and the thrusting of both of said carriers downwardly sufficiently to bring said first mentioned contact elements against said cooperating contact elements.

9. A pressure contact assembly including a support having a top working surface, a pair of spaced, slidably-mounted non-conducting electrode carriers extending downwardly from said support, an electrode mounted on the top of each of said electrode carriers, a pair of conductors and an interposed main switch assembly connecting said electrodes to a source of electric current, means limiting the upward movement of said carriers and therewith of said electrodes, means exerting a force to maintain the carriers in maximum raised position but enabling the carriers to be thrust downwardly against the force of said latter mentioned means, a contact element connected with the lower portion of each carrier, said contact elements electrically connected to each other, a pair of lower cooperating contact elements so arranged as to be contacted by said first mentioned contact elements respectively when said carriers are thrust downwardly against the force of said latter mentioned means, electrically actuated means for operating said main switch assembly, a circuit for said electrically actuated means, said first mentioned contact elements, said cooperating contact elements and a control switch included in said last mentioned circuit, an electric appliance for use with said contact assembly, said appliance comprising a built-in electric heating element, a pair of legs on said appliance, terminals for said heating element in said legs respectively, and an outer conductor element on the bottom of each leg connected to the respective terminal, said legs being so located and positioned that when said appliance is properly placed on said contact assembly said legs will rest on said electrode carriers with said contact elements on said legs in contact with said electrodes, the weight of said vessel being sufficient to cause said electrode carriers to be pressed downwardly.

References Cited in the file of this patent

UNITED STATES PATENTS

| 2,054,714 | Reich | Sept. 15, 1936 |
| 2,685,662 | Feinberg et al. | Aug. 3, 1954 |

FOREIGN PATENTS

| 89,015 | Switzerland | Apr. 16, 1921 |